United States

Nagasaki

3,781,087

Dec. 25, 1973

[54] MOLDING CONSTRUCTION OF PLATES OF LIQUID CRYSTAL DISPLAY

[75] Inventor: Jin Nagasaki, Shimosuwa-Machi, Japan

[73] Assignee: Kabushiki Kaisha Suwa Seikosha, Tokyo, Japan

[22] Filed: May 8, 1972

[21] Appl. No.: 251,050

Related U.S. Application Data

[63] Continuation-in-part of Ser. No. 50,603, June 29, 1970, abandoned.

[52] U.S. Cl. ............ 350/160 LC, 350/267, 350/312
[51] Int. Cl. .................................................. G02f 1/34
[58] Field of Search ................. 350/160 R, 160 LC, 350/267, 312; 264/1, 272

[56] References Cited
UNITED STATES PATENTS

| | | | |
|---|---|---|---|
| 3,578,844 | 5/1971 | Churchill et al. | 350/160 LC |
| 2,915,943 | 12/1959 | Brown et al. | 350/160 R |
| 3,614,210 | 10/1971 | Caplan | 350/160 LC |
| 3,674,342 | 7/1972 | Castellano et al. | 350/160 LC |
| 3,675,988 | 7/1972 | Soref | 350/160 LC |

FOREIGN PATENTS OR APPLICATIONS 1,123,117  8/1968  England ..................... 350/160 LC OTHER PUBLICATIONS
Electronic Design, Vol. 3, Feb. 1, 1968, pg. 50–62.
The Glass Industry, Aug. 1968; pg. 423–425.
Electronics; July 6, 1970; pg. 69

*Primary Examiner*—David Schonberg
*Assistant Examiner*—V. P. McGraw
*Attorney*—Alex Friedman et al.

[57] ABSTRACT

A method of preparing a liquid crystal device is disclosed in which two plates, at least one of which is transparent, are molded in situ within an encasement having a window therethrough through which said liquid crystal device can be viewed. The plates are spaced apart, forming, in combination with an insulating spacer, a chamber containing liquid crystal material. The molding operation seals the chamber against the entry of oxygen and moisture. The resultant device is stable because well sealed.

5 Claims, 2 Drawing Figures

PATENTED DEC 25 1973    3,781,087

MOLDING CONSTRUCTION OF PLATES OF LIQUID CRYSTAL DISPLAY

CROSS REFERENCE TO RELATED APPLICATION

This application is a Continuation-In-Part of my co-pending U.S. Pat. application Ser. No. 50,603 filed June 29, 1970, and now abandoned.

BACKGROUND OF THE INVENTION

In the construction of liquid crystal display devices, it is necessary to cope with a number of problems. Paramount among these are (1) holding opposing plates in stable and fixed relationship, (2) method of attachment of leads, and (3) exclusion of moisture and oxygen.

A variety of methods have been used to hold the opposing plates constituting a liquid crystal display device in spaced-apart opposition. Adhesives have frequently been used but it is difficult to control the spacing between the plates, such spacing being critical for many applications, within closely specified tolerances. Also, the attachment of leads to the conductive films on the opposing plates is a relatively simple matter; however, the coating is so thin that special care must be taken to avoid the possibility of applying stresses to the leads which will detach same from the conductive coatings.

The prevention of the entry of either moisture or oxygen into the space between the plates which is occupied by the liquid crystal material is particularly important. As is well known, oxygen attacks liquid crystal material, causing it to darken in color thereby progressively lowering the usefulness of the material and the display device containing same. In addition, the entry of moisture introduces an equally serious problem. In display devices of the type with which the present application is concerned, a voltage is imposed between the two plates. The voltage used is sufficient to electrolyze water. Such a process introduces two serious disadvantages: (1) hydrogen and oxygen are generated within the space occupied by the liquid crystal material, the oxygen causing degradation of the material, and the presence of both hydrogen and oxygen raising the possibility of an explosion; (2) assuming that a DC voltage is applied, the oxide film on the negative plate will be reduced to the metal, degrading the transparency of the system.

SUMMARY OF THE INVENTION

Two plates are placed in opposition with a spacer therebetween defining a volume. A selected liquid crystal material is placed within the volume, essentially filling same. The filling of the volume is carried out under conditions such that air and moisture are excluded. The opposing plates protrude beyond the spacer so that a portion of the conductive film on the interior of each of the plates is accessible for joining leads thereto. At least one of the plates and the conductive coating thereon are transparent. A housing of a thermoplastic or thermosetting resin is molded around the components of the liquid crystal display, the shape of the molding being such that a window therein allows viewing of the liquid crystal display therethrough. The leads attached to the conductive films are of sufficient length so that they are accessible at the exterior of the molding. In one of the embodiments, the coating upon one plate is divided into a narrow section and a wide section, and said narrow section is electrically connected to the coating on the opposing plate. In this embodiment, the two leads are connected to the two sections on one coating.

Accordingly, an object of the present invention is to provide an improved liquid crystal display system in which the components thereof are firmly held in position by means of a housing molded around same.

Another object of the present invention is to provide an improved liquid display system wherein accidental separation of leads from plates is prevented.

A further object of the present invention is to provide an improved liquid display system in which degradation of the system as a result of entry of moisture or oxygen is prevented.

Yet another object of the present invention is to provide an improved liquid display system wherein both leads can be applied to a single plate having an appropriately divided coating thereon.

Still other objects and advantages of the invention will in part be obvious and will in part be apparent from the specification.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which.

DESCRIPTION OF THE PREFERRED EMBODIMENTS

Figure 1:
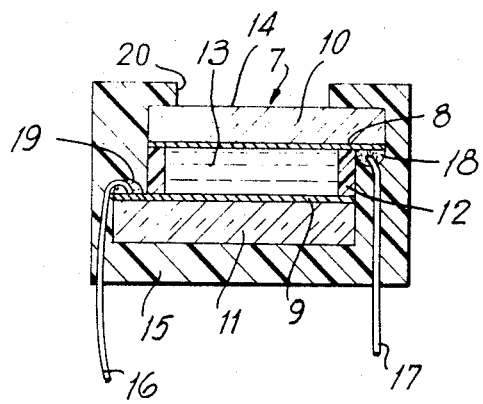
FIG. 1 is a cross-sectional view of a liquid crystal display system enclosed in a molded housing in accordance with the present invention.

A liquid crystal display system in accordance with the present invention is indicated generally by the reference numeral 7. The display system consists of plate 10 having transparent conductive coating 8 thereon, plate 11 having conductive coating 9 thereon and a spacer 12 defining a volume filled with liquid crystals 13. Plate 10 with its coating 8 protrudes beyond spacer 12, making it possible to attach lead 17 to coating 8 exteriorly of the volume occupied by the liquid crystal material. Preferably lead 17 is attached to coating 8 by means of a conductive resin 18, such resins being prepared by the introduction of metallic particles (silver, nickel or aluminum) into an epoxy resin, for instance. Plate 11 and its coating 9 also extend beyond spacer 12, and conductive coating 9 is attached to lead 16 by conductive resin 19.

Finally, by means well known in the art, the components of liquid crystal display system 7 are held firmly in place while enclosure 15 is molded around same. As can be seen from FIG. 1, a window 20 is provided through which liquid crystal display system 7 is visible. As is evident, housing 15 could be molded with a second window at the bottom thereof, but in general, such a second window is neither needed nor desirable.

It will be noted that plates 10 and 11 protrude beyond spacer 12 at opposite ends of the enclosure holding the liquid crystals 13. However, the selection of the directions in which the plates overlap the spacer 12 is completely arbitrary except that, in general, it is inconvenient to have both plates overlapping the spacer at the same edge, due to the fact that the clearance between the conductive coatings is in the order of microns. However, with proper shaping of the plates 10 and 11 it is possible to have them protrude beyond the spacer 12 at the same edge so long as there are provided non-overlapping portions.

Figure 2:
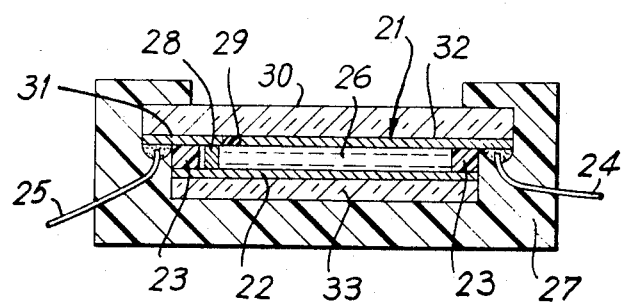
FIG. 2 is a cross-sectional view of another embodiment of the present invention in which both leads are attached to one plates.

Another embodiment of the present invention is shown in FIG. 2. The point of this embodiment is to make it possible to attach both leads 24 and 25 to the coating on the upper plate 30. To achieve this end, conductive coating 21 on the upper plate is divided into two sections, a narrow section 31 and a wide section 32. Furthermore, narrow section 31 is connected to conductive coating 22 on lower plate 33 by conductor 28. Conductor 28 must obviously conform in length to spacer 23. In the view shown in FIG. 2, wide section 32 is separated from narrow section 31 of conductive coating 21 by an insulating strip 29. As is obvious, it is not necessary that an actual insulating strip be present. It is merely necessary that the two sections 31 and 32 lack electrical connections therebetween. The division between sections 31 and 32 can be effected by grinding or otherwise removing a strip of conductive coating 21 by suitable chemical or mechanical means.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An improved method of fixing together the elements of a display device including two opposing plates, conductive coatings on the interiors of said plates, at least one of said plates and the conductive coating thereon being transparent, a spacer between said plates, said spacer in combination with said plates defining a volume containing a liquid crystal material, and leads electrically connected to each of said conductive coatings, wherein said improvement comprises the step of molding an organic resin encasement around said elements of said display device in situ, said organic resin being selected from the group consisting of thermoplastic and thermosetting resins, the relative dimensions of said encasement and said leads being such that one end of each lead protrudes from said encasement and said encasement having therein a window in registry with said transparent plate.

2. An improved structure for fixing together the elements of a display device including two opposing plates, conductive coatings on the interiors of said plates, at least one of said plates and the conductive coating thereon being transparent, a spacer between said plates, said spacer in combination with said plates defining a volume containing a liquid crystal material, and leads electrically connected to each of said conductive coatings, wherein said improvement comprises an organic resin encasement around said elements of said display device, said organic resin being a member of the group consisting of thermoplastic and thermosetting resins and having been molded about said elements of said display device in situ, said organic resin being selected from the group consisting of thermoplastic and thermosetting resins, the relative dimensions of said encasement and said leads being such that one end of each lead protrudes from said encasement and said encasement having therein a window in registry with said transparent plate.

3. An improved method as defined in claim 1, wherein each of said plates and the conductive coating thereon protrudes outwardly beyond said spacer, thereby rendering each of said conductive coatings readily accessible for attachment of leads.

4. An improved structure as defined in claim 2, wherein that conductive coating on the interior surface of the plate nearer said window is divided into a narrow section and a wide section having no electrical connection with each other and one of said leads is connected electrically to said narrow section and the other of said leads is connected electrically to said wider section, and said structure further comprises an electrical connection between said narrow section and the opposing conductive coating, thereby providing electrical connection between said one lead and the conductive coating on the plate further from said window.

5. An improved structure as defined in claim 4, further comprising an insulator between said wide section and said narrow section.

* * * * *